3,595,688
THERMALLY STABILIZED CELLULOSE MATERIAL PRODUCED BY TREATING CELLULOSE WITH MELAMINE IN COMBINATION WITH DIGLYCOLAMINE, DIMETHYL FORMAMIDE OR PIPERAZINE
Fred S. Sadler, Racine, Wis., assignor to McGraw-Edison Company, Milwaukee, Wis.
No Drawing. Filed Mar. 27, 1969, Ser. No. 811,215
Int. Cl. H01b 3/50, 3/52
U.S. Cl. 117—136                      10 Claims

ABSTRACT OF THE DISCLOSURE

A cellulose fiber material having improved thermal stability. The cellulose fiber material is treated with the combination of melamine and a compound selected from the group consisting of diglycolamine, piperazine, and dimethyl formamide. Treatment with this combination of ingredients enables the cellulose fibers to withstand deterioration by the action of heat over extended periods of time. The cellulose fiber material having improved thermal stability is useful as an insulator in electrical apparatus.

---

This invention relates to cellulosic materials having improved thermal stability, and more particularly to cellulosic materials to be used as insulation in electrical apparatus.

Cellulose fiber materials tend to deteriorate when subjected to elevated temperatures for extended periods of time resulting in a progressive reduction in their strength until eventually they fracture. When used in an electrical apparatus, the deterioration of the cellulose is accelerated by other factors, particularly where the insulation is in contact with, or immersed in, a liquid dielectric such as transformer oils. The elevated temperatures may cause the liquid dielectrics to break down into their chemical constituents and the resultant deterioration products may in turn attack the cellulose fiber material.

The problem of deterioration of cellulose fiber material at elevated temperatures is also encountered when using cellulose fiber cord reinforcing in rubber articles such as pneumatic tires, steam hoses, conveyor belts and the like. In this situation, the cellulose fiber reinforcement, which is subjected to elevated temperatures either from external heat or from heat generated internally by reason of repeated flexing, as in the case of pneumatic tires, tends to deteriorate, resulting in a progressive reduction in the strength of the cellulose fiber reinforcement.

The present invention is directed to a cellulose fiber material impregnated with a combination of melamine and either diglycolamine, piperazine or dimethyl formamide. Impregnating the cellulose fiber material with this combination of additives unexpectably increases the thermal stability and toughness of the cellulose fiber to a degree that cannot be achieved by the individual use of the additives and enables the fibers to withstand deterioration by the action of heat over extended periods of time. The fibers are not only protected against thermal deterioration, but are also stabilized against attack from decomposition products of transformer oils or other liquid dielectrics. For this reason the cellulose material treated in accordance with the invention is particularly useful in oil-filled transformers or other similar electrical apparatus.

The cellulose fiber material to be treated can be rayon, paper, cotton, linen or other common cellulosic materials. When used as an insulation material in an electrical apparatus, the cellulose material will generally be composed of rag, kraft or manilla paper.

The active ingredients, namely melamine, and either diglycolamine, piperazine, or dimethyl formamide are preferably applied to the cellulose fibers in the form of an aqueous solution although in some cases the pure active ingredients can be used. The fibers can be impregnated in any suitable manner such as by immersing the fibers in a treating solution for a time sufficient to fully impregnate the fibers, or by spraying, brushing, dipping, size pressing or the like. It is important that all of the individual fibers or filaments of the cellulose material be impregnated with the treating solution so that each individual cellulose fiber is able to react with the active ingredients. Impregnation differs from surface coating processes in which only the outer surface of the fibrous material is coated with the active ingredient and the individual fibers on the interior of the material are generally uncoated.

The impregnation of the cellulose fiber material can be carried out at room temperature or at elevated temperatures up to the boiling point of the solution employed. The time of contact between the cellulose fibers and the solution should be sufficient to permit penetration or impregnation of the fibers. Generally a contact time of 15 seconds to 10 minutes is adequate for impregnation, although more rapid impregnation, such as obtained in a size press on a paper machine, or longer periods of impregnation may be employed without adverse effects.

While an aqueous treating solution is the most practical, other types of evaporable solvents or carriers can be substituted for water. In some cases the cellulose material may be treated with the pure active ingredients, without solution, or treated with a dispersion of the active ingredients, but for most purposes a treating solution is used.

To prepare the treating solution, the melamine and the diglycolamine, piperazine, dimethyl formamide or mixtures thereof are added to the water or solvent, and held at an elevated temperature of 85° C. to 90° C. with stirring for a minimum of about 20 minutes to obtain solution.

The concentration of the active ingredients used in the solution may vary considerably depending on the end use of the cellulose material and the method of application. Although it is somewhat more difficult to achieve the desired impregnation from very dilute solutions as compared to more concentrated solutions, solutions containing as little as 0.5% active ingredients have been used. Generally, solutions containing from 2 to 10% active ingredients are employed with about 4.0% being preferred.

The weight relationship between the melamine and the diglycolamine, piperazine, or dimethyl formamide is not particularly critical. It has been found that the melamine can be used in the weight ratio of 1:4 to 4:1 with respect to the other active ingredient.

Generally, the greater the amount of active ingredients present, the more the cellulose fibers are stabilized. However, in order to obtain the benefits of the treatment of this invention it is necessary that the active ingredients remain in the cellulose fiber and be actually present in the fiber at the time the fiber is subjected to the heating which would ordinarily cause deterioration. It has been found that the active ingredients present in the cellulose fiber in the amount from 0.7 to 100% by weight of the fiber is effective to produce substantial improvement in the heat age resistance of the fiber, although some improvement will result from lower concentrations.

The dry treated cellulose fiber material has a nitrogen content in the range of 0.1 to 3% by weight.

While the above description has shown the melamine and the diglycolamine, piperazine or dimethyl formamide combined in a single treating solution, it is contemplated that separate treating solutions of the melamine and the other active ingredient can be used. When using separate treatments, either the melamine or the other active ingredients can be initially applied to the cellulose, followed by treatment with the remaining ingredient. In this case, however, it is preferred to apply the second treating solution to the fibers before complete drying of the first solution.

The cellulose fibers treated with melamine and either diglycolamine, piperazine, or dimethyl formamide have greatly improved stability enabling the cellulose fiber material to withstand the deteriorating action of heat over extended periods of time. In addition, when the cellulose fiber material is to be used as an insulating material in electrical apparatus and immersed in transformer oil or other dielectrics, it has been found that the treated paper will not deteriorate or materially discolor the transformer oil.

The following examples illustrate the process of the invention:

EXAMPLE NO. 1

A series of samples were prepared by immersing sheets of kraft paper 8" x 8" and 5 mils thick in various aqueous solutions until the sheets of paper had become thoroughly impregnated. The sheets were allowed to air dry at room temperature. The impregnated sheets of paper were then placed in glass tubes containing insulated copper wire 21" long (16 gauge "Formvar") and copper foil (14" x 1" x .002"). Each paper-copper system was placed in an oven at 135° for 16 hours. During this time a pressure of 0.1 mm. was maintained. The evacuated tubes containing the paper were filled under vacuum with an inhibited transformer oil, leaving an air space in the tube of approximately 15% of the total volume. The air space was then filled to one atmosphere of pressure with dry air. The tubes were then sealed off with an oxygen gas torch. A series of sealed glass tubes was then placed in an oven and aged at 170° C. for 5 days, while a second series was maintained in the oven at 170° C. for 12 days. At the completion of the aging period, the tubes were opened and the physical properties of the paper samples were determined. These properties are compared with an untreated paper, aged under the same conditions. The results are shown in the following table:

TABLE I

| Weight percent of active ingredients in aqueous solution | Hours aged at 170° C. | Percent original tensile retained | Percent original toughness retained |
| --- | --- | --- | --- |
| 1___ Control—not treated | 120 | 39.6 | 1.25 |
| 2_____do | 288 | (1) | (1) |
| 3___ 2% diglycolamine | 120 | 87.0 | 89.0 |
| 4_____do | 288 | (1) | (1) |
| 5___ 2% dimethyl formamide | 120 | 48.9+ | 26.2 |
| 6_____do | 288 | 34.7 | 13.3 |
| 7___ 2% piperazine | 120 | 94.0 | 93.8 |
| 8_____do | 288 | 51.6 | 23.0 |
| 9___ 2% melamine | 120 | 56.5 | 15.7 |
| 10_____do | 288 | 35.0 | 14.2 |
| 11__ 2% diglycolamine and 2% melamine | 120 | 84.7 | 70.5 |
| 12_____do | 288 | 71.8 | 44.6 |
| 13__ 2% dimethyl formamide and 2% melamine | 120 | 77.7 | 51.7 |
| 14_____do | 288 | 52.8 | 22.9 |
| 15__ 2% piperazine and 2% melamine | 120 | 117.0 | 125.3 |
| 16_____do | 288 | 96.5 | 91.2 |

¹ Destroyed.

The data set forth in the above table illustrates the unusual and unexpected improvement in tensile strength retention and toughness retention brought about by the invention. For example, Sample No. 3 using a 2% diglycolamine and aged for 120 hours (5 days) had a tensile strength retention of 87.0%, meaning that the tensile strength was 87.0% of an untreated unaged sample, and a toughness retention of 89%, while aging a similar Sample No. 4, also containing diglycolamine, for 288 hours (12 days) resulted in the destruction of the sample.

Samples No. 9 and 10, using 2% melamie, showed a tensile strength retention of 56.5% for 120 hours aging and 35.0% for 288 hours aging, and also showed a toughness retention of 15.7% for 120 hours aging and 14.2% for 288 hours aging.

In contrast to this, the combination of 2% melamine and 2% diglycolamine, as shown by Samples 11 and 12, had substantially better tensile strength retention and toughness retention than either of the individual ingredients. For example, Sample No. 12, which was aged for 288 hours had a tensile strength retention of 71.8% and a toughness retention of 44.6%, which as a substantial improvement over that of Sample No. 4 using diglycolamine alone and over that of Sample No. 10 using melamine alone.

Similar improvements can be noted in the physical properties of the combination of melamine and piperazine (Samples Nos. 15 and 16) as compared with the physical properties of melamine and piperazine alone (Samples Nos. 7–10), and in the physical properties of the combination of melamine and dimethyl formamide (Samples Nos. 13 and 14) as compared with the physical properties of melamine and dimethyl formamide alone (Samples Nos. 5, 6, 9, 10).

These tests show the definite improvement in physical properties of the cellulose material after aging at elevated temperatures brought about by the use of melamine and either diglycolamine, piperazine or dimethyl formamide.

I claim:
1. A method of treating cellulose fiber material to increase its physical properties at elevated temperatures, comprising the steps of impregnating the cellulose fibers with the combination of melamine and a compound selected from the group consisting of diglycolamine, piperazine, dimethyl formamide and mixtures thereof.

2. The method of claim 1, wherein said melamine is present in a weight ratio of 1:4 to 4:1 with respect to said compound.

3. The method of claim 1, wherein said dry fiber material has a nitrogen content in the range of 0.1 to 3% by weight.

4. The method of claim 1, wherein the cellulose fiber material is impregnated with a treating solution containing the combination of melamine and said compound.

5. The method of claim 4, wherein the treating solution is an aqueous solution.

6. A method of increasing the thermal stability of cellulose fiber material, comprising the steps of impregnating the cellulose fiber material with an aqueous solution of melamine and a compound selected from the group consisting of diglycolamine, piperazine, dimethyl formamide and mixtures thereof, said melamine being present in a weight ratio of 1:4 to 4:1 with respect to said compound, and thereafter evaporating the water to provide a dried product having from 0.1 to 3% by weight of nitrogen.

7. The method of claim 6 in which the aqueous solution contains from 2 to 10% by weight of said melamine and said compound.

8. A cellulose fiber product having improved physical properties at elevated temperatures, comprising a cellulose fiber base impregnated with the combination of melamine and a compound selected from the group consisting of diglycolamine, dimethyl formamide, and piperazine and mixtures thereof, said cellulose base containing from 0.1 to 3% by weight of nitrogen.

9. The cellulose fiber product of claim 8 wherein said melamine is present in a weight ratio of 1:4 to 4:1 with respect to said compound.

10. In an electrical instrumentality, an electrical conductor insulated with a cellulose fiber material impregnated with the combination of melamine and a compound selected from the group consisting of diglycolamine, dimethyl formamide, piperazine and mixtures thereof, said cellulose material containing from 0.1 to 3.0% by weight of nitrogen and said melamine being present in the weight ratio of 1:4 to 4:1 with respect to said compound.

References Cited

UNITED STATES PATENTS

| | | | |
|---|---|---|---|
| 2,665,733 | 1/1954 | Buckwalter | 117—143X |
| 3,102,159 | 8/1963 | Ford et al. | 174—17 |
| 3,211,516 | 10/1965 | Sadler | 8—116.2 |
| 3,224,902 | 12/1965 | Sadler et al. | 117—143 |
| 3,403,968 | 10/1968 | Brummet et al. | 252—63.7X |

GEORGE F. LESMES, Primary Examiner

J. CANNON, Assistant Examiner

U.S. Cl. X.R.

117—143, 154; 8—116.2, 133; 252—63.7; 174—17; 317—259; 152—359